United States Patent [19]
Piton

[11] Patent Number: 5,675,244
[45] Date of Patent: Oct. 7, 1997

[54] POWER-SUPPLY APPARATUS FOR POWERING A CONTROL CIRCUIT FOR CONTROLLING A POWER SWITCH COMPONENT

[75] Inventor: Michel Piton, Lyons, France

[73] Assignee: Gec Alsthom Transport SA, Paris, France

[21] Appl. No.: 345,460

[22] Filed: Nov. 21, 1994

[30] Foreign Application Priority Data

Nov. 22, 1993 [FR] France .................................... 93 13934

[51] Int. Cl.$^6$ ............................................. G05F 1/652
[52] U.S. Cl. ........................................ 323/901; 323/232
[58] Field of Search ............................... 323/232, 302, 323/371, 901; 363/21, 49, 89

[56] References Cited

U.S. PATENT DOCUMENTS 3,928,776 12/1975 Thiele .
4,370,701 1/1983 Western ................................... 323/901
4,504,778 3/1985 Evans .
4,638,226 1/1987 Damiano et al. ........................ 363/123
4,962,349 10/1990 Albach et al. ........................... 323/901

FOREIGN PATENT DOCUMENTS

0044663A3 1/1982 European Pat. Off. .
2191343 2/1974 France .

Primary Examiner—Stuart N. Hecker
Attorney, Agent, or Firm—Sughrue, Mion, Zinn, Macpeak & Seas

[57] ABSTRACT

Power-supply apparatus for powering a control circuit for controlling a power switch component, the apparatus powering said circuit from the voltage across the terminals of the component in the off state, and including an energy-storage capacitor, said apparatus further including means for charging said energy-storage capacitor during the periods in which said component is on.

8 Claims, 1 Drawing Sheet

POWER-SUPPLY APPARATUS FOR POWERING A CONTROL CIRCUIT FOR CONTROLLING A POWER SWITCH COMPONENT

The present invention relates in general to controlling power switch components, used especially in power converters, and more particularly to powering the control circuits, also referred to as "triggers", of such components.

BACKGROUND OF THE INVENTION

Two types of power-supply apparatus for powering control circuits for controlling power switch components are known: namely a first type of apparatus which uses an external energy source, and a second type of apparatus which uses the voltage across the terminals of the power switch component in the off state (which voltage may also be referred to as the "off" voltage) to charge an "energy-storage" capacitor during the periods in which the component is off.

In addition to requiring such an external energy source, that first type of apparatus suffers from the drawbacks of not always guaranteeing satisfactory dynamic isolation (or dv/dt immunity), and of requiring electrical isolation which is expensive and often complex to achieve, in particular since the required isolation voltage is high.

That second type of apparatus suffers in particular from the drawback of not being suitable for use when the component is off for relatively short periods. Said energy-storage capacitor can be charged:

either by means of a "diode pump" (or bootstrap) type system, but such a system also suffers from the drawback of not operating for all of the various applications (e.g. in three-level uninterrupted power supplies);

or else by means of an optionally controlled current source (ballast transistor, etc.): cf. the document entitled "New driver concept for MOS-gated devices", N. Kumagai, Fuji Electric Corporation Japan, PCIM Europe, March–April 1993; that solution further suffers from the drawback of implementing active components used at the limits of their safety margins as soon as the off voltage of the component to be controlled increases.

OBJECTS AND SUMMARY OF THE INVENTION

A particular object of the present invention is to avoid the above-mentioned drawbacks.

The present invention provides power-supply apparatus for powering a control circuit for controlling a power switch component, the apparatus powering said circuit from the voltage across the terminals of the component in the off state, and including an energy-storage capacitor, said apparatus essentially further including means for charging said energy-storage capacitor during the periods in which said component is on.

In an embodiment of the invention, said means for charging the energy-storage capacitor during the periods in which said component is on include:

an oscillating circuit connected across the terminals of said component;

a "connection" element enabling the energy-storage capacitor to be connected across the terminals of the inductance of said oscillating circuit once the energy stored in the capacitor of said oscillating circuit, during the periods in which the component 3 is off, has been transferred to the inductance, on switching said component on.

BRIEF DESCRIPTION OF THE DRAWING

Other objects and characteristics of the present invention will appear on reading the following description of an embodiment given with reference to the accompanying drawing, in which.

MORE DETAILED DESCRIPTION

Figure 1:
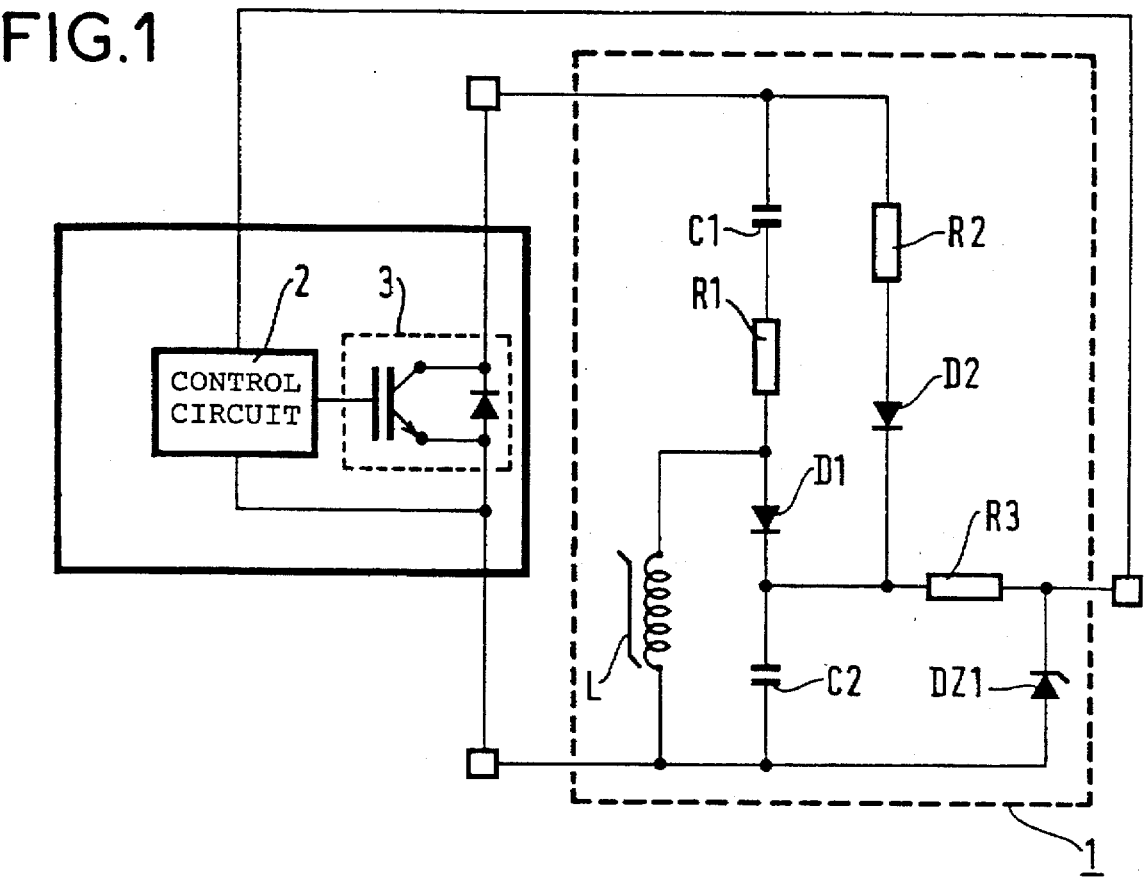
FIG. 1 is a diagram showing an embodiment of apparatus of the invention.

The power-supply apparatus 1 shown in FIG. 1 is designed to power a control circuit 2 for controlling a power, switch component 3, constituted in this example by an insulated-gate component such as an "IGBT" (Insulated Gate Bipolar Transistor), in which case said control circuit has two possible consumption states, namely a high-consumption state at the control instants at which said component is switched on, and a low-consumption state at all other times.

The power-supply apparatus 1 shown in FIG. 1 powers the control circuit 2 from the voltage across the terminals of the component 3 in the off state. In the example shown in FIG. 1, the power-supply apparatus includes:

an energy-storage capacitor C2;

voltage-regulation means supplying the power-supply voltage for powering the control circuit 2 from the voltage across the terminals of the energy-storage capacitor C2;

means for charging the energy-storage capacitor C2 during the periods in which said component is on; and additional means for powering said control circuit at start-up.

In the example shown in FIG. 1, said means for charging the energy-storage capacitor during the periods in which said component is on include:

an oscillating circuit connected across the terminals of the component 3 and including an inductance L and a capacitor C1; and a connection element constituted in this example by a diode D1, and enabling the energy-storage capacitor C2 to be connected across the terminals of the inductance L of the oscillating circuit once the energy stored in the capacitor C1 of said oscillating circuit (during the periods in which the component 3 is off) has been transferred to the inductance L of the oscillating circuit, on switching the component 3 on.

In the example shown in FIG. 1, said additional means for powering the control circuit 2 on start-up include a charging circuit for charging the energy-storage capacitor C2 during the periods in which the component 3 is off, the charging circuit itself being constituted by a circuit connected across the terminals of the component 3, and including a resistor R2 and a diode D2 in addition to the capacitor C2.

In the example shown in FIG. 1, said voltage-regulation means comprise a Zener diode DZ1 and a resistor R3.

The control circuit 2, which in this example has two possible consumption states, is powered by means of two circuits:

a first circuit constituted by the resistor R2 and the diode D2 which are associated with the voltage-regulation means R3, DZ1; a "low-consumption" current flows through this circuit during the periods in which the component 3 is off and enables the system to be maintained on stand-by (pending a command to switch the component on); and a second circuit constituted by the capacitor C2 associated with the regulation means R3-DZ1; which circuit supplies:

the high-consumption current at the instant at which the component 3 is switched on; and the low-consumption current during the periods in which the component 3 is on.

Because the power-supply apparatus also includes means for charging the energy-storage capacitor C2 during the periods in which the component 3 is on, a high value can be chosen for the resistance of resistor R2, thereby minimizing the losses due to any mismatch between the value of the low-consumption current and the value of the current flowing through the resistor.

The fact that the power-supply apparatus also includes such means for charging the energy-storage capacitor C2 during the periods in which the component is on also enables the system to be self-matching, the system transferring the energy it needs at each switch-over, and makes operation possible in which the periods during which the component is off are relatively short (naturally, with the exception of that one of the off periods which precedes start-up, which period is longer, and as a result, enables the capacitor C2 to be charged via its charging circuit during the off periods to a sufficient level for switching the component on for the first time).

Figure 2A:
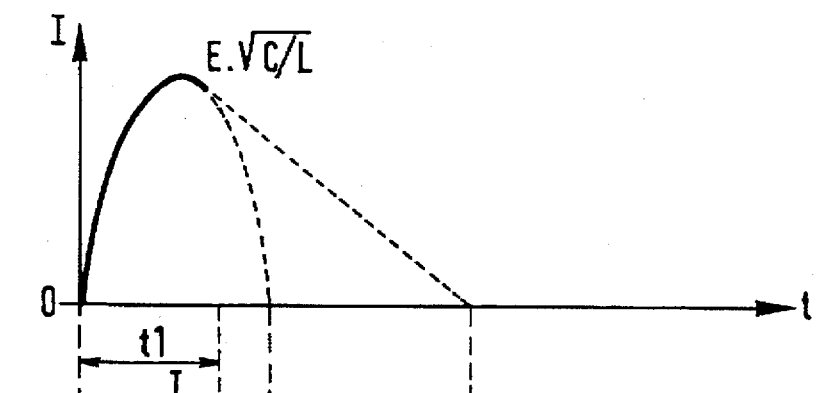
FIG. 2 is a diagram showing how the apparatus shown in FIG. 1 operates.
Figure 2B:
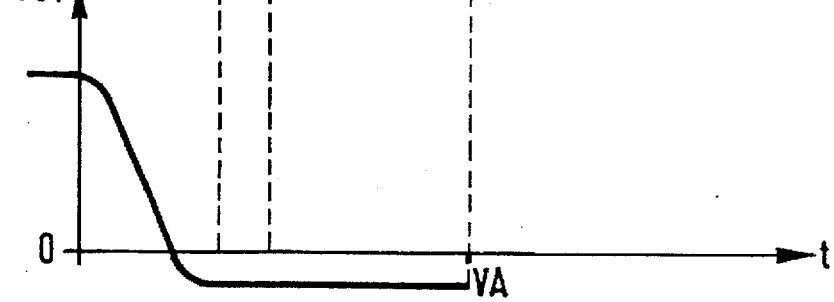

The means for charging the energy-storage capacitor C2 during the periods in which said component is on operate as explained below with reference to FIGS. 1 and 2.

When component 3 closes, the capacitor C1 (which is charged via said oscillating circuit during the periods in which the component is off) discharges via the inductance L in oscillating manner. The current I flowing through the inductance L is then a portion of a sine-wave of half-period $T/2=\pi.\sqrt{(L.C1)}$. The voltage VC1 across the terminals of the capacitor C1 would tend to become inverted. But at t=t1, VC1 reaches −VC2 (where VC2 designates the voltage across the terminals of the capacitor C2, and VA designates the power-supply voltage obtained across the terminals of the Zener diode DZ1, with VC2 being in the vicinity of VA), and the diode D1 starts conducting. The inductance L then becomes demagnetized via the mesh L-D1-C2. To a first approximation, the demagnetization occurs at constant voltage and the current flowing through the inductance L decreases linearly to zero.

At t=t1+t2, the current flowing through the inductance L is zero and all of the energy initially stored in the capacitor C1 (i.e. $\frac{1}{2}.C1.E^2$, where E designates the voltage across the terminals of the component in the off state) has been transferred to the capacitor C2. In this way, the corresponding power supplied by the power-supply apparatus is:

$$Pa=\frac{1}{2}.C1.E^2.f$$

(where f designates the switching frequency of the component).

In this way each switch-over of the component triggers recharging of the energy-storage capacitor C2 and, each time the component is switched on, the energy required for switching it on is provided.

In numerous types of application, the off voltage E of the component varies within a relatively wide range (e.g. in electrical traction applications). The capacitance of the capacitor C1 must therefore be calculated to provide the energy required to switch the component on when the voltage E is at its minimum (equal to Emin).

Since the power to be supplied by the control circuit is equal to:

$$Pg=VA^2.Ce.f$$

where Ce designates the input capacitance of the component, the capacitance of the capacitor C1 must satisfy the following relationship:

$$C1=2.Ce(VA/Emin)^2.$$

In contrast, for a voltage E greater than Emin, the surplus energy which increases with the square of the voltage must be dissipated in the power-supply circuit, and this considerably handicaps the regulator DZ1.

However, losses in the regulator DZ1 may be limited by using saturation of the inductance L, and by further equipping said oscillating circuit with a resistor R1 having resistance chosen to be equal to or in the vicinity of the critical resistance $R1=2\sqrt{(Lsat/C1)}$ of the oscillating circuit formed of the elements Lsat (value of L in the saturated state) and C1, so as to have a damped state for the circuit when the inductance L is saturated.

In this way, for E=Emin, the inductance L is dimensioned such that the energy is transferred from the capacitor C1 to the inductance L1 prior to saturation thereof; the resistor R1 is then a long way from the value of the critical resistance of the circuit, and the state is oscillating. In contrast, for E >Emin, the value of the inductance L drops, and the state of the circuit is damped, the surplus energy being dissipated in the resistance R1.

I claim:

1. A power-supply apparatus for powering a control circuit for controlling a power switch component, the apparatus powering said control circuit from the voltage across the terminals of the component in the off state, and including an energy-storage capacitor, said apparatus further including means for charging said energy-storage capacitor during the periods in which said component is on;

wherein said means for charging the energy-storage capacitor during the periods in which said component is on include:

an oscillating circuit connected across the terminals of said component and having an inductance and a capacitor; and a connection element enabling the energy-storage capacitor to be connected across the terminals of the inductance of said oscillating circuit once the energy stored in the capacitor of said oscillating circuit, during the periods in which the component is off, has been transferred to the inductance, on switching said component on.

2. An apparatus according to claim 1, further including voltage-regulation means supplying the power-supply voltage of said control circuit from the voltage across the terminals of said energy-storage capacitor.

3. An apparatus as claimed in claim 1, wherein said energy-storage capacitor powers said circuit when said component is in said off state without the use of a power source external to said apparatus.

4. An apparatus according to claim 1, further including additional means for powering said control circuit on start-up.

5. An apparatus according to claim 4, wherein said additional means for powering said control circuit on start-up include means for charging said energy-storage capacitor during the periods in which said component is off.

6. An apparatus according to claim 1, wherein, with said control circuit having two possible consumption states, namely a high-consumption state at the instants at which said component is switched on, and low-consumption state at all other times, the apparatus further includes a first power-supply circuit connected across the terminals of said component and supplying a "low-consumption" current during the periods in which said component is off, and a second power-supply circuit connected across the terminals of said energy-storage capacitor and supplying a "high-consumption" current at the instants at which said component is switched on, or a "low-consumption" current during the periods in which said component is on.

7. An apparatus according to claim 5, wherein said first power-supply circuit includes said means for charging the energy-storage capacitor during the periods in which said component is off.

8. An apparatus for powering a control circuit for controlling a power switch component, the apparatus powering said circuit from the voltage across the terminals of the component in the off state, and including an energy-storage capacitor, said apparatus further including:

means for charging said energy-storage capacitor during the periods in which said component is on; and an oscillating circuit connected across the terminals of the component and comprising an inductance and a capacitor; and wherein, with it being possible for the value of the voltage across the terminals of the component in the off state to vary within a certain range, the inductance of said oscillating circuit is dimensioned such that the energy is transferred from the capacitor of the oscillating circuit to the inductance prior to saturation thereof, for the minimum value of the voltage, and after saturation of the inductance for any value of the voltage greater than the minimum value, and wherein said oscillating circuit further includes a resistor having resistance that is equal to or in the vicinity of the critical resistance of the oscillating circuit for the value of said inductance in the saturated state.

* * * * *